(12) United States Patent
Swanner (10) Patent No.: US 7,032,921 B2
(45) Date of Patent: Apr. 25, 2006

(54) CART TO TRANSPORT EQUIPMENT OR THE LIKE

(76) Inventor: Jessee Jackson Swanner, 210 Clearview Dr., Waynesville, NC (US) 28785

( * ) Notice: Subject to any disclaimer, the term of this patent is extended or adjusted under 35 U.S.C. 154(b) by 190 days.

(21) Appl. No.: 10/604,383

(22) Filed: Jul. 16, 2003

(65) Prior Publication Data

US 2005/0012308 A1    Jan. 20, 2005

(51) Int. Cl.
B62B 1/00    (2006.01)

(52) U.S. Cl. .................. 280/645; 280/652; 280/655

(58) Field of Classification Search ............... 280/645, 280/646, 651, 652, 654, 655, 655.1, 62, 47.24, 280/47.26, 79.2; 5/627
See application file for complete search history.

(56) References Cited

U.S. PATENT DOCUMENTS

| | | | | |
|---|---|---|---|---|
| 2,811,367 | A | * | 10/1957 | Goodale .................. 280/645 |
| 2,918,296 | A | * | 12/1959 | Goodale .................. 280/645 |
| 3,820,807 | A | * | 6/1974 | Curran .................... 280/47.3 |
| 3,860,254 | A | * | 1/1975 | Wegener .................. 280/652 |
| 3,886,606 | A | * | 6/1975 | Bradford ..................... 5/627 |
| 3,931,985 | A | | 1/1976 | Knebel |
| 4,253,677 | A | | 3/1981 | Wissler |
| 4,266,791 | A | | 5/1981 | Myers |
| 4,444,405 | A | * | 4/1984 | Barrus .................... 280/47.3 |
| 4,624,467 | A | | 11/1986 | Burns |
| 4,635,956 | A | | 1/1987 | Morrissette |
| 4,669,743 | A | | 6/1987 | Tipke |
| 4,705,280 | A | | 11/1987 | Burns |
| 4,824,137 | A | | 4/1989 | Bolden |
| 4,826,202 | A | | 5/1989 | Morrissette |
| 5,330,212 | A | * | 7/1994 | Gardner ..................... 280/40 |
| D363,585 | S | * | 10/1995 | Crossman et al. .......... D34/12 |
| 5,562,299 | A | | 10/1996 | Morrissette |
| 5,785,334 | A | | 7/1998 | Robinson |
| 5,853,189 | A | * | 12/1998 | Swartzlander ............. 280/652 |
| 6,152,461 | A | | 11/2000 | Dunks |
| 6,152,462 | A | | 11/2000 | Barrett |
| 6,164,671 | A | | 12/2000 | Darling, III |
| 6,217,043 | B1 | | 4/2001 | Chumley |
| 6,308,968 | B1 | | 10/2001 | Hollingsworth |
| 6,446,981 | B1 | | 9/2002 | Wise et al. |
| 6,533,298 | B1 | | 3/2003 | Sims |

FOREIGN PATENT DOCUMENTS

| | | | |
|---|---|---|---|
| DE | 3044595 | * | 6/1982 |
| WO | WO 95/20933 | * | 8/1995 |

\* cited by examiner

*Primary Examiner*—J. Allen Shriver
(74) *Attorney, Agent, or Firm*—Charles L. Moore; Moore and Van Allen, PLLC (57) ABSTRACT

A cart may include a compartment to retain equipment or items. A first pair of handles may be extendable from a one end of the compartment and a second pair of handles may be extendable from another end of the compartment. The first and second pairs of handles may permit the cart to be simultaneously pushed and pulled. A pair of wheels may each be removably mounted to an axle on each side of the compartment.

33 Claims, 6 Drawing Sheets

CART TO TRANSPORT EQUIPMENT OR THE LIKE

FIELD OF THE INVENTION

The present invention relates to a cart, and more particularly to a cart to transport equipment, such as athletic or sports equipment, camping equipment or the like, or other items.

BACKGROUND OF INVENTION

In athletics, camping and similar activities, bulky and sometimes heavy equipment and other gear, such as balls, bats, tents or canopies, ice chests, water coolers and the like, often need to be transported from one location to another, for example, from a vehicle in a parking lot to an athletic field or camp site. Transporting the equipment may require several people each carrying a portion of the load or several trips by one person. Carts that may be used for such purposes are generally either pushed or pulled by only one person and can be difficult to handle by one person when heavily loaded. The handling difficulty may be exacerbated over steep, rough or irregular terrain. Additionally, these carts are generally bulky and require time consuming and laborious disassembly to occupy minimal space in a standard sport utility vehicle (SUV), minivan or similar vehicle or to even fit into such a vehicle. Hand tools are also usually required for such disassembly and re-assembly.

Accordingly, there is a need to provide a cart that may be simultaneously pushed and pulled by two operators and may be easily maneuvered over steep and irregular terrain even when heavily loaded. There is also a need to provide a cart that can be easily and quickly assembled and disassembled to occupy minimal space when stowed and that can easily be assembled and disassembled with only basic if any hand tools.

SUMMARY OF INVENTION

In accordance with an embodiment of the present invention, a cart may include a compartment to retain equipment or items. A first pair of handles may be extendable from one end of the compartment and a second pair of handles may be extendable from an opposite end of the compartment. The first and second pairs of handles may permit the cart to be simultaneously pushed and pulled. A pair of wheels may each be removably mounted to an axle on each side of the compartment.

In accordance with another embodiment of the present invention, the cart may include a platform mounted to each end of the cart. Each platform may be pivotal between an operative position to support objects and a stowed position to stow the cart. In accordance with a further embodiment of the present invention, a support leg or pair of support legs may be attachable to each platform. Each support leg may be movable between a non-operative or retracted position to stow or roll the cart and an operative or extended position to stabilize the cart when the cart is stationary.

In accordance with another embodiment of the present invention, a method of making a cart may include forming a compartment. The method may also include attaching a first pair of handles extendable from one end the cart and attaching a second pair of handles extendable from another end of the cart. The first and second pairs of handles permit the cart to be simultaneously pushed and pulled. Each wheel of a pair of wheels may be removable mounted to an axle on each side of the cart.

DETAILED DESCRIPTION

The following detailed description of preferred embodiments refers to the accompanying drawings which illustrate specific embodiments of the invention. Other embodiments having different structures and operations do not depart from the scope of the present invention.

Figure 1:
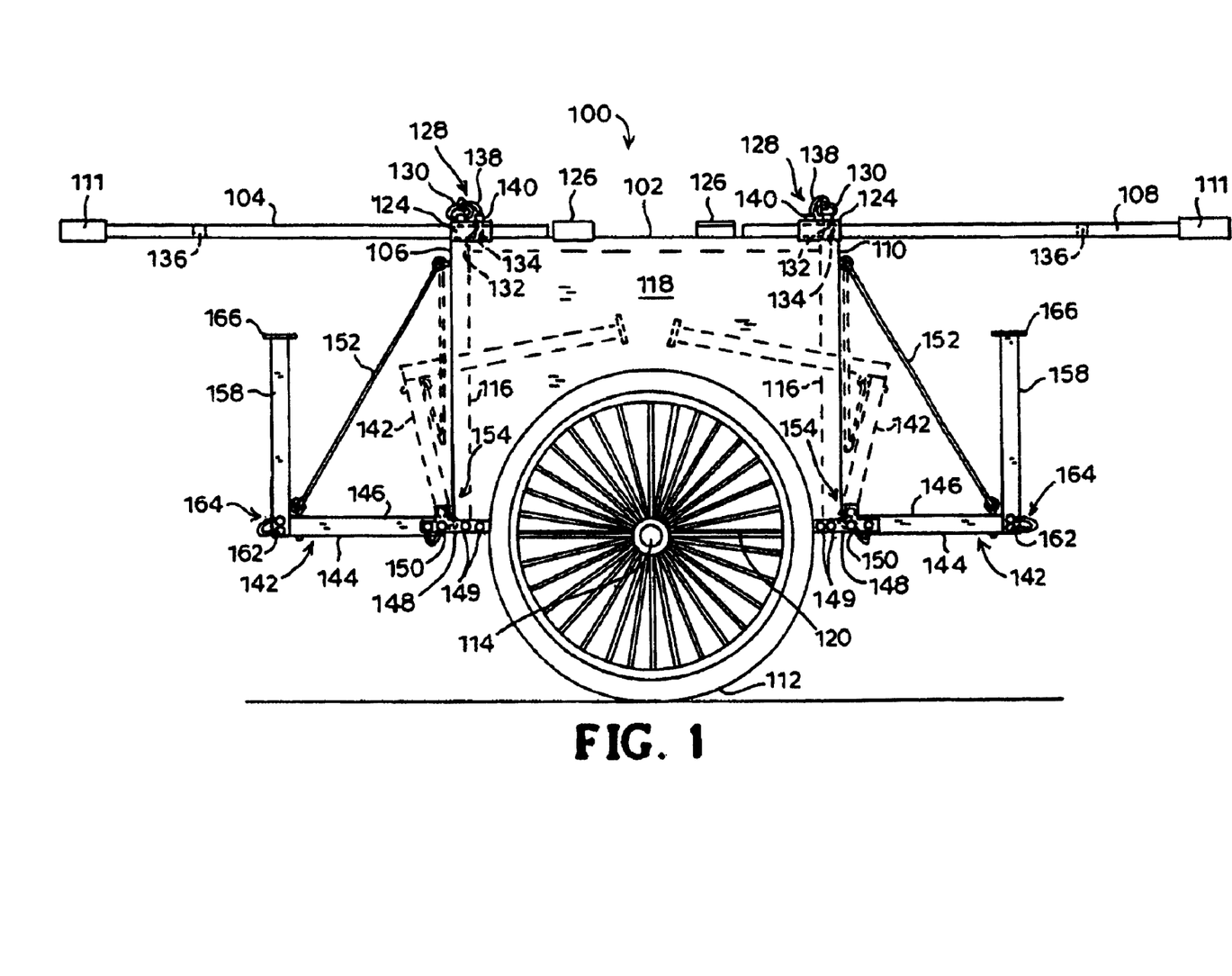
FIG. 1 is a side elevation view of a cart with support legs retracted and handles in an extended position for simultaneously pushing and pulling the cart in accordance with an embodiment of the present invention.

FIG. 1 is a side elevation view of a cart 100 in accordance with an embodiment of the present invention. The cart 100 may include a container or compartment 102 to retain or hold equipment or items. A first pair 104 of handles may be extendable from one end 106 of the compartment 102 and a second pair 108 of handles may be extendable from another end 110 of the compartment 102. The first and second pairs 104 and 108 of handles may permit the cart to be simultaneously pushed and pulled. The handles 104 and 108 may each be separate to provide better control and maneuverability of the cart 100. With the two pairs of handles 104 and 108, the cart 100 may be carried similar to a stretcher for short distances to maneuver around or over obstacles. Each handle 104 and 108 may have a grip 111 slid onto or attached to an end thereof. The grips 111 may be a flexible plastic, polymer or rubber type material similar to that used for bicycles, motorcycle or the like. A wheel 112 for mobility of the cart 100 may be removably mounted to an axle or axles 114 on each side of the compartment 102.

The cart 100 may include a frame 116 shown in phantom in FIG. 1. The frame 116 may be one inch (2.54 centimeters) square aluminum tubing or a similar material of the appropriate size and strength depending upon the weight of any loads expected to be transported by the cart 100. Four side panels 118 (only one shown in FIG. 1) and a base or floor panel 120 may be attached to the frame 116 to form the compartment 102. The side panels 118 and floor panel 120 may each be about one-sixteenth inch or about 1.5 mm. thick aluminum plating or a similar material of appropriate thickness and strength to support the weight of the expected loads while maintaining the weight of the cart 100 as low as possible. The compartment 102 may have dimensions corresponding to the size of the loads expected to be carried. Alternatively, the compartment 102 may be at least large enough so that each wheel 112 may be placed in the compartment 102 when the cart 100 is stowed or transported, as best shown in FIG. 3.

Each wheel 112 may be removably mounted to the axle 114 proximate to a midpoint 122 (FIG. 3) between each end 106 and 110 of the compartment 102 to substantially balance a load in or on the cart 100 between the first and second pairs of handles 104 and 108. Accordingly, there may be little if any appreciable load on the handles 104 and 108. The axle or axles 114 may also be removably attached to the cart 100 proximate to the base or floor panel 120 of the compartment 102. A single axle 114 may extend from one side of the cart 100 to the other for mounting each wheel 112. Alternatively, each wheel 112 may be mounted to an associated axle 114' as best shown in FIG. 3. Each associated axle 114' may be removably attached to the cart 100 proximate to the base or floor panel 120 of the cart. Each associate axle 114' could also be attached at a predetermined elevation from the base 120 of the compartment 102.

Each wheel 112 may include a steel rim and spokes with an inflatable tire, such as a standard bicycle wheel and tire. Alternatively, the rim and spokes could be aluminum, composite material or similar light weight material to reduce the weight of the cart itself.

Figure 2:
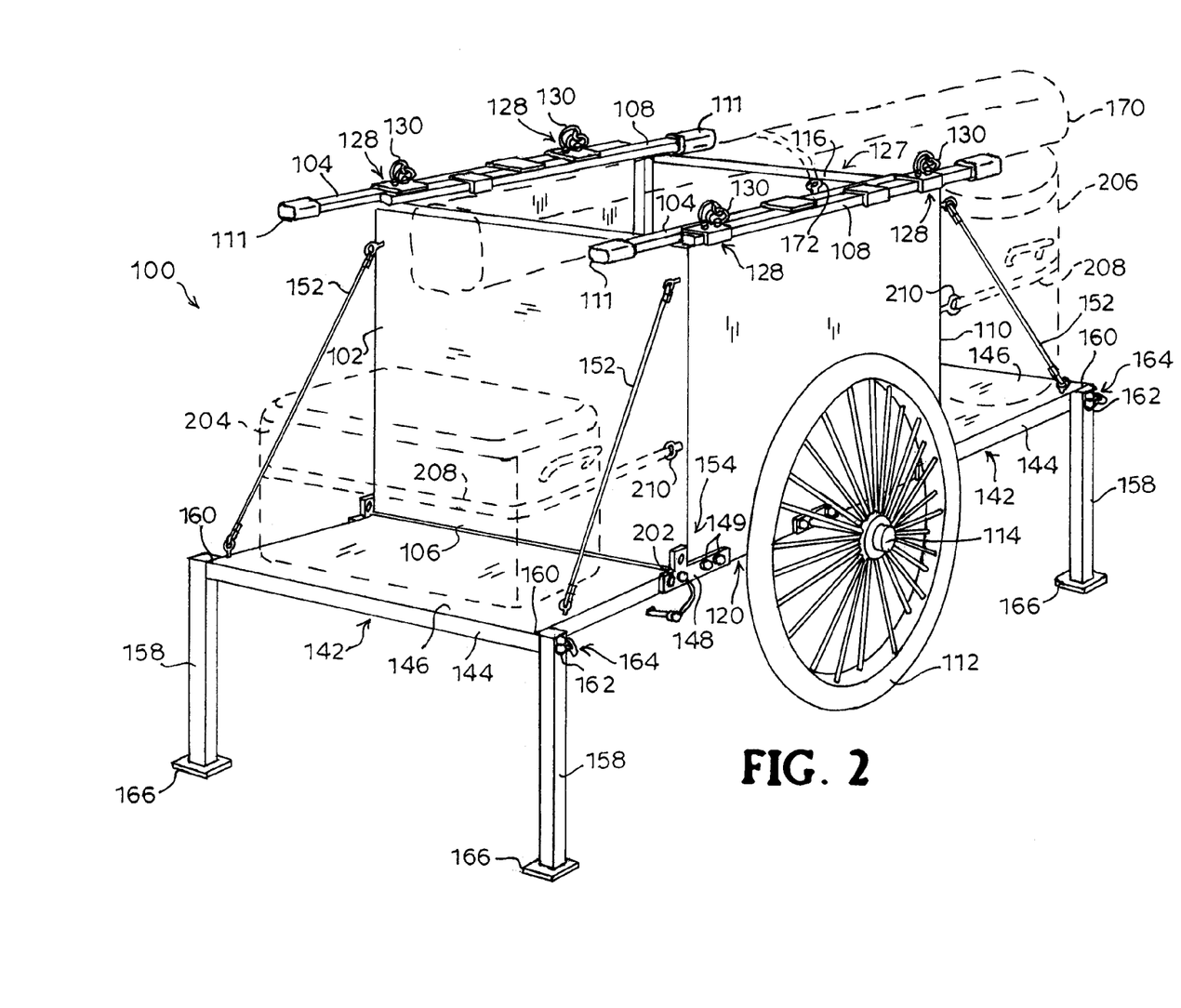
FIG. 2 is a perspective view of a cart with handles in a retracted position and support legs in an operative position to stabilize the cart when stationary in accordance with an embodiment of the present invention.
Figure 3:
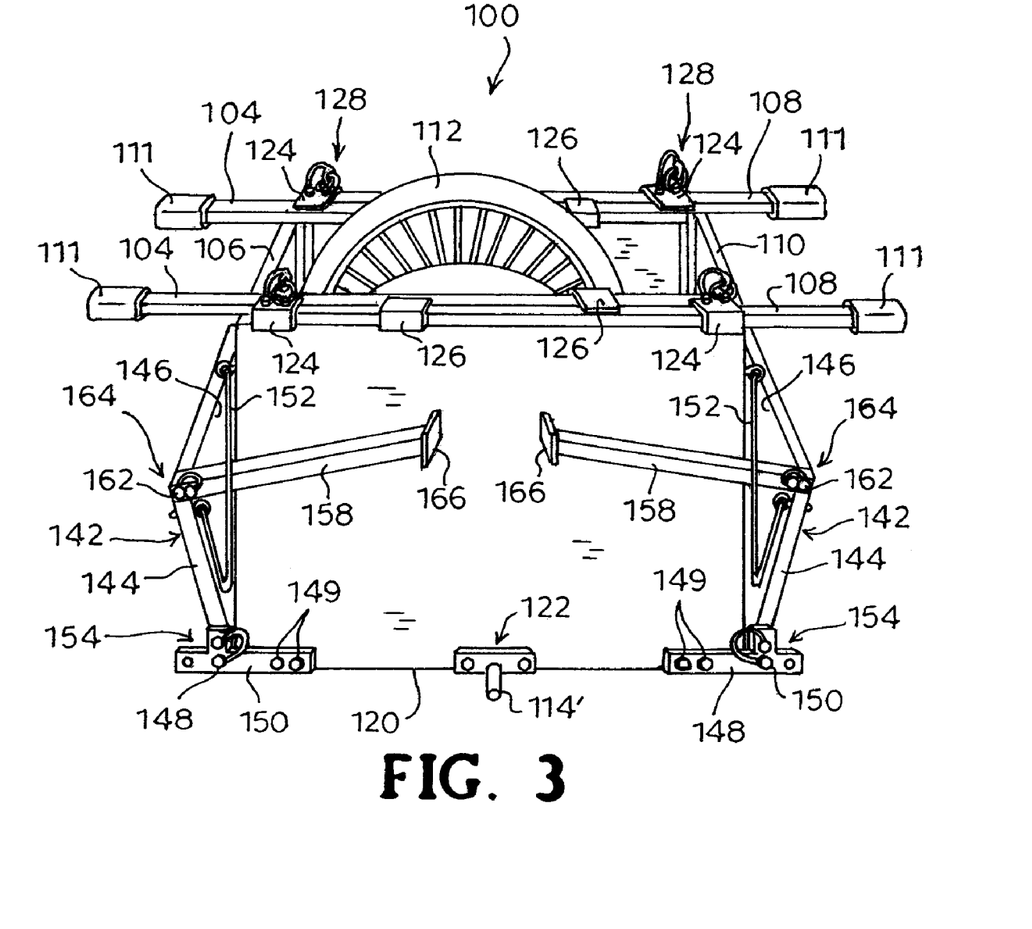
FIG. 3 is a perspective view of a cart with handles in a retracted position, wheels removed and platforms and support legs in a retracted position to stow or transport the cart in accordance with an embodiment of the present invention.

Each of the first and second handles 104 and 108 may be movable between a retracted position as shown in FIGS. 2 and 3 to stow or transport the cart 100 and an extended position shown in FIG. 1 to roll or move the cart 100. First channel guides 124 and second channel guides 126 or the like may be attached to an upper portion 127 of the cart 100 through which each of the first and second handles 104 and 108 may be slid between the retracted position and the extended position. The first and second handles 104 and 108 may be mounted to the cart 100 offset relative to one another to permit the handles 104 and 108 to slide adjacent to one another when the handles 104 and 108 are slid into the retracted position as shown in FIG. 2. A mechanism 128 may be provided to retain each handle 104 and 108 in one of the retracted position or the extended position. Examples of the mechanism 128 may include one of a releasable locking pin assembly 130 as shown in FIG. 1, a latch, a set screw or the like. The example of the mechanism 128 as shown in FIG. 1 may further include openings 132 formed in each first channel guide 124. At least a first opening 134 and a second opening 136 may be formed in each handle 104 and 108 at a predetermined spacing from one another to define that extended and retracted positions (FIG. 1). The openings 132 in each first channel guide 124 may be aligned with the corresponding first openings 134 in each handle 104 and the releasable pin 130 may be inserted through the aligned openings 132 and 134 to retain the handles 104 and 108 in their extended positions. Similarly, the handles 104 and 108 may be slid within the channel guides 124 and 126 to align each opening 136 in the handles 104 and 108 with each corresponding opening 132 in the first channel guides 124. The releasable pin 130 may then be inserted through the aligned openings 132 and 136 of each first channel guide 124 and handle 104 and 108 to retain the handles 104 and 108 in their retracted positions. Each of the releasable pins 130 may be attached to the cart 130 by a keeper wire 138 or the like that may be attached to the cart 100 by a bolt 140, screw or similar fastener to prevent the pins 130 from being lost or misplaced.

In an alternate embodiment, the retaining mechanism 128 may include a set screw rather than releasable locking pin 130 received into a correspondingly threaded opening in the first channel guide 124. The set screw may then be tightened to retain each of the handles 104 and 108 in the respective retracted or extended positions.

Figure 4:
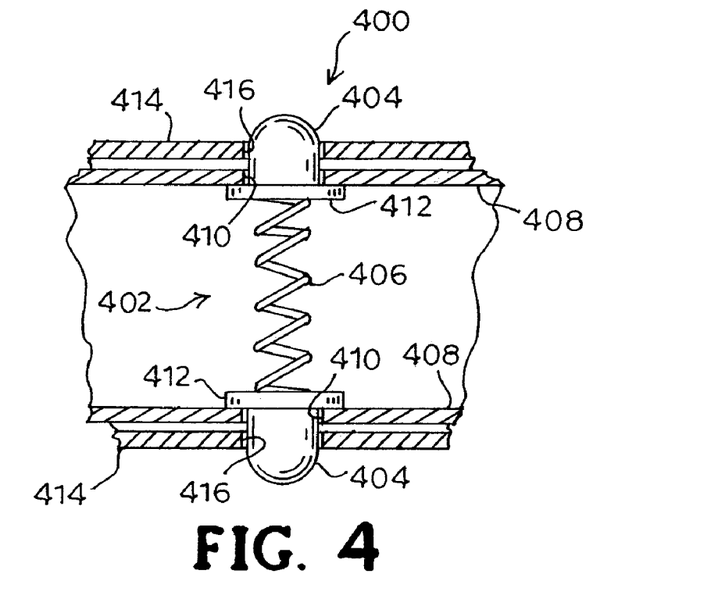
FIG. 4 is a detailed side elevation cross-sectional view of an exemplary biased latching assembly that may be used to assemble a cart in accordance with an embodiment of the present invention.

Another example of the retaining mechanism 128 may be a latching device, similar to the latching device 400 shown in FIG. 4. The latching device 400 may comprise a latch assembly 402 including a pair of bullet or ball shaped elements 404 that may be biased by a spring, such as a coil spring 406 or the like, as shown in FIG. 4. The latch assembly 402 may be disposed within a first or inner tube 408 with the bullet shaped elements 404 extending through an openings 410 formed in opposite sides of the first tube 408. Each bullet element 404 may include a rim 412 or land to retain the bullet element 404 within the first tube 408. The first tube 408 may slide within a second or outer tube 414. Openings 416 may be formed in opposite sides of the second tube 414 to receive at least a portion of the bullet elements 404 to retain the first or inner tube 408 in position relative to the second or outer tube 414. In the example shown in FIG. 4, the first or inner tube 408 may correspond to the handles 104 and 108 with a similar latch assembly 702 being disposed at each of the first and second openings 134 and 136 in FIG. 1. The second or outer tube 414 may correspond to the first channel guides 124 in FIG. 1.

Referring back to FIGS. 1–3, a platform 142 may be pivotally mounted to each end 106 and 110 of the cart 100. Each platform 142 may be pivoted between an operative position to support objects, as shown in FIGS. 1 and 2, and a stowed position to stow or transport the cart 100, as shown in FIG. 3 and in phantom in FIG. 1. Each platform 142 may be formed by a platform frame 144 with a plate 146 attached to the platform frame 144. The platform frame 144 may be one inch (2.54 centimeters) square aluminum tubing or a similar material of the appropriate size and strength depending upon the weight of any loads expected to be supported by the platform 142. The platform plate 146 may be about one-sixteenth inch or about 1.5 mm. thick aluminum plating or a similar material of appropriate thickness and strength to support the weight of the expected loads while maintaining the weight of the cart 100 as low as possible. Each platform 142 may be pivotally mounted to the compartment 102 by a bracket 148 or hinge arrangement. The bracket 148 may be attached to the compartment 102 and cart frame 116 by suitable fasteners 149, such as bolts or the like. The platform frame 144 may be attached to the bracket 148 by a suitable fastener 150, such as a hinge bolt or the like, that may permit the platform 142 to be rotated about the fastener 150 between the operative and stowed positions.

A platform support assembly 152 may be provided to support each platform 142 in the operative position. The support assembly 152 may include a chain, cable, articulating bracket or the like attached to the cart 100 or compartment 102 and cart frame 116 to further support objects placed on each of the platforms 142. The support assembly 152 may also be foldable or articulable to permit each platform to be pivoted between the operative and stowed positions. The main compartment 102 and separate end platforms 142 permit the load to be separated for better organization and permit securing the load to the cart 100 in a safer manner.

Figure 5:
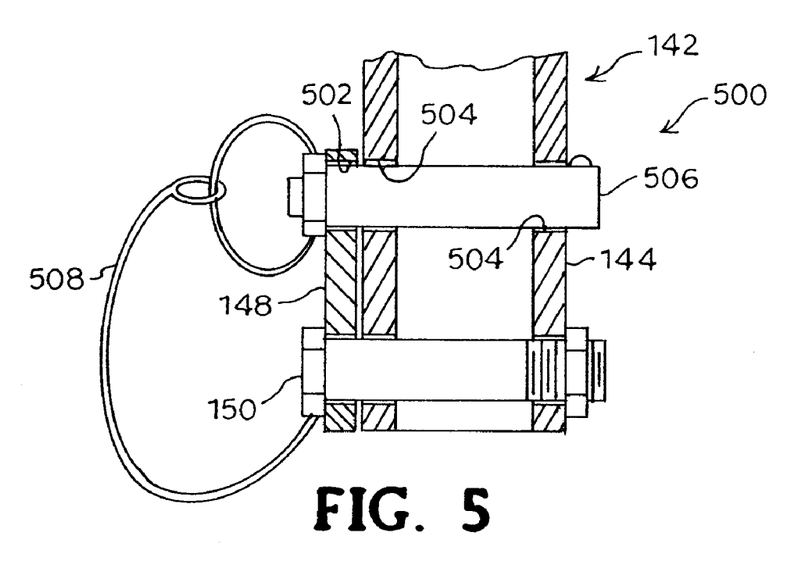
FIG. 5 is a detailed cross-sectional view of an exemplary releasable locking pin arrangement that may be used to assemble a cart in accordance with an embodiment of the present invention.

A platform retention arrangement 154 may be provided to retain each platform 142 in at least the stowed position when the cart 100 is stowed for storage or transportation. Examples of the retention arrangement 154 may include a latch mechanism, a releasable locking pin arrangement or the like. A detailed view of an example of a releasable locking pin arrangement 500 that may be used for the retention arrangement 154 is shown in FIG. 5. A first opening 502 may be formed in the bracket 148 and a second opening 504 may be formed through the frame 144 of the platform 142. The openings 502 and 504 may be aligned when the platform 142 is pivoted to the stowed position as shown in FIG. 3 and in phantom in FIG. 1. A releasable locking pin 506 (FIG. 5) may be inserted through the aligned opening 502 and 504 to retain the platform 142 in the stowed position for storage or transportation of the cart 100. Releasable locking pins, detent ring pins and the like such as pin 506 for quickly assembling and disassembling items such as cart 100 are known. An example of the pin 506 may be a detent ring pin as provided by Pivot Point, Inc. of Hustisford, Wis. or Avibank Manufacturing of North Hollywood, Calif. A keeper wire 508 or lanyard may be attached to the locking pin 506 and to the fastener 150 to prevent the locking pin from being lost or misplaced.

Referring also to FIG. 2, in another embodiment of the present invention, a second opening 202 may be formed in the bracket 148. The second opening 202 may be aligned with the opening 504 (FIG. 5) formed in the frame 144 of the platform 142 when the platform 144 is rotated into the operative position to support objects as shown in FIG. 2. The releasable locking pin 506 (FIG. 5) may then be inserted through the second opening 202 and the opening 504 when aligned to retain the platform 142 in the operative position to support objects, such as an ice chest 204, a water cooler 206 (shown in phantom in FIG. 2) or other objects. The objects may be secured to the cart 100 by straps 208, bungee cords or the like (not shown in FIG. 2) attached to eyelets 210 or similar fastening devices.

Figure 6:
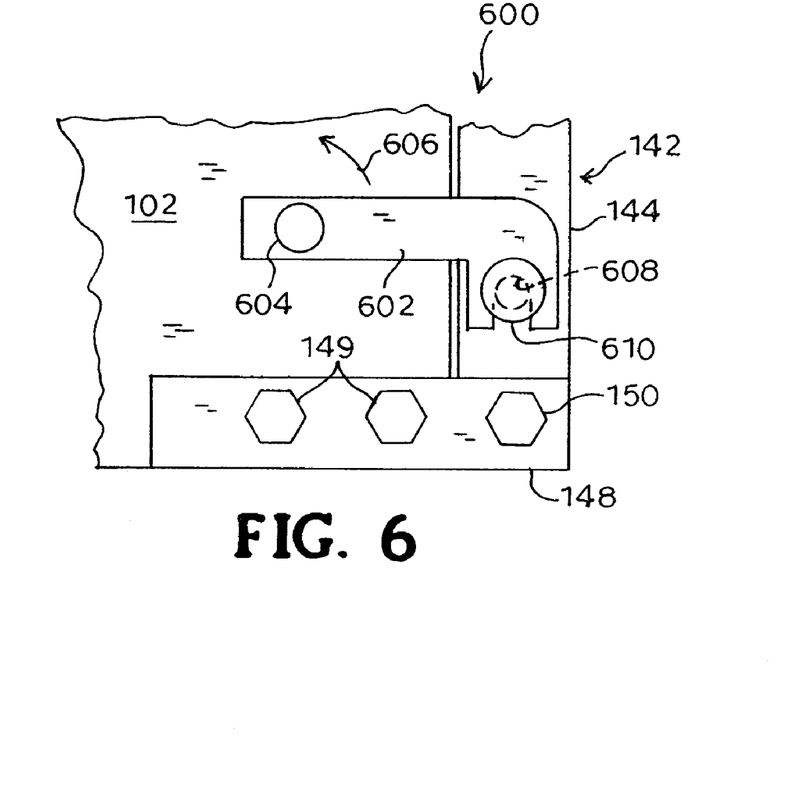
FIG. 6 is a detailed side elevation view of an exemplary latch arrangement that may be used to assemble a cart in accordance with an embodiment of the present invention.

FIG. 6 is an illustration of another example of a latch arrangement 600 that may be used for the platform retention arrangement 154. The latch arrangement 600 may include a lever 602 attached at one end to the compartment 102 by a fastener 604, such as a rivet, bolt or the like, that permits the lever 602 to rotate about the fastener 604 as illustrated by arrow 606. Another end of the lever 602 may have a notch 608 formed therein to releasably connect or latch to a button 610 attached to the platform frame 144 to retain the platform 142 in a non-operative or stowed position as shown in FIG. 3 and in phantom in FIG. 1.

Referring back to FIGS. 1–3, at least one support leg 158 or a pair of support legs 158 may be attached to each platform 142. A support leg 158 may be attached proximate to an outer corner 160 of each platform 142. Each support leg 158 may be one inch (2.54 cm) square aluminum tubing or the like. Each of the support legs 158 may be movable between a non-operative or retracted position to stow or roll the cart 100 and an operative or extended position to stabilize the cart 100 when the cart 100 is not being rolled or stationary. Each support leg 158 may pivot about a suitable fastener 162 to move between the retracted and extended positions. The non-operative or retracted position is illustrated in FIG. 1 where the cart 100 may be rolled or moved and in FIG. 3 where the cart 100 may be stowed. The operative or extended position of the support legs 158 is illustrated in FIG. 2 where the cart 100 may be set up for stationary use. In an alternate embodiment, the support legs 158 may be attached to the frame 116 or compartment 102 similar to that shown in FIG. 8.

Each support legs 158 may be attached to the frame 144 of the platform 142 by a fastener 162 that may permit the support leg 158 to pivot or rotate about the fastener 162 between the retracted and extended positions. A retainer assembly 164 may retain each support leg 158 respectively in the extended position or the retracted position. Examples of the retainer assembly 162 may be a latch arrangement, releasable locking pin or the like. The latch arrangement may be similar to the latch arrangement 400 of FIG. 4 or latching device 600 of FIG. 6.

Figure 7:
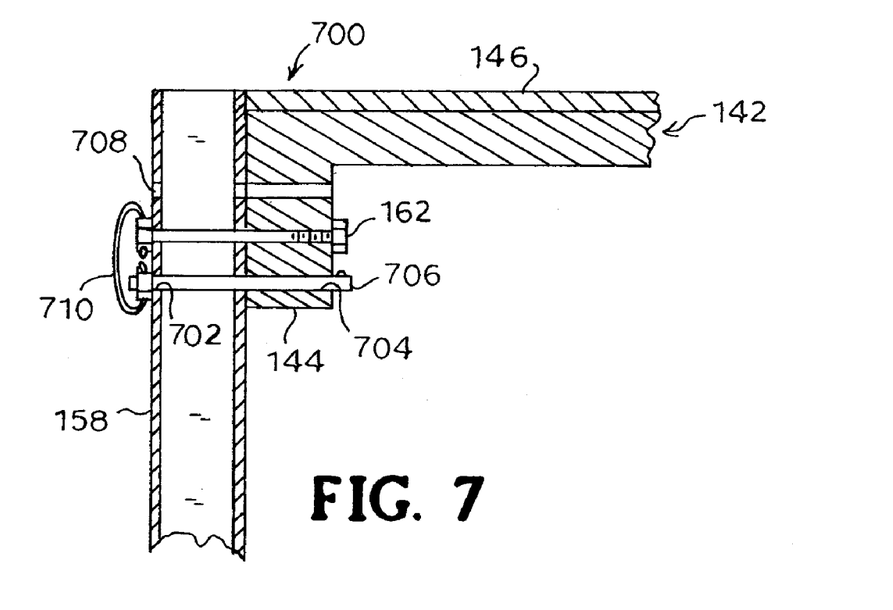
FIG. 7 is a detailed cross-section view of an exemplary releasable locking pin assembly that may be used to retain a support leg in one of a retracted position or an extended position in accordance with an embodiment of the present invention.

FIG. 7 is a detailed cross-sectional view of an exemplary releasable pin arrangement 700 that may be used for the retainer assembly 164 in accordance with an embodiment of the present invention. A first opening 702 may be formed in the support leg 158 and another opening 704 may be formed in the frame 144 of the platform 142. A releasable locking pin 706 may be inserted through the first opening 702 and the opening 704 in the frame 144 when the openings are aligned to retain the support leg 158 in the operative or extended position as illustrated in FIG. 2. A second opening 708 may be formed in the support leg 158 on an alternate side of the fastener 162 from the first opening 704. With the locking pin 706 removed, the support leg 158 may be pivoted to the non-operative or retracted position where the second opening 708 and the other opening 704 in the platform frame 144 are aligned. The releasable locking pin 706 may be inserted through the second opening 708 and the other opening 704 when aligned to retain the support leg 158 in the non-operative or retracted position as shown in FIGS. 1 and 3. A keeper wire 710 or lanyard may be attached to the detent or locking pin 706 and to the fastener 162 to prevent the locking pin 706 from being lost or misplaced. Accordingly, the cart 100 may be disassembled and re-assembled without the need for hand tools or the like.

Each support leg 158 may have a foot 166 attached to an end of the support leg 158 opposite to where the fastener 162 pivotally attaches the support leg to the platform 142. The foot 166 may be a substantially square or rectangular plate of metal, plastic or the like. The foot 166 may prevent the end of leg support 158 from sinking into soft ground that could cause the cart 100 to tip or become destabilized when in stationary use.

In an embodiment of the present invention illustrated in FIG. 2, an upper portion 127 of the compartment 102 may be adapted to carry objects 170 (shown in phantom in FIG. 2), such as tents canopies or other bulky objects. Eyelets 172 or similar fastening devices may be mounted to the cart 100 to hook straps, bungee cords or the like to secure the object 170 to the cart 100.

Figure 8:
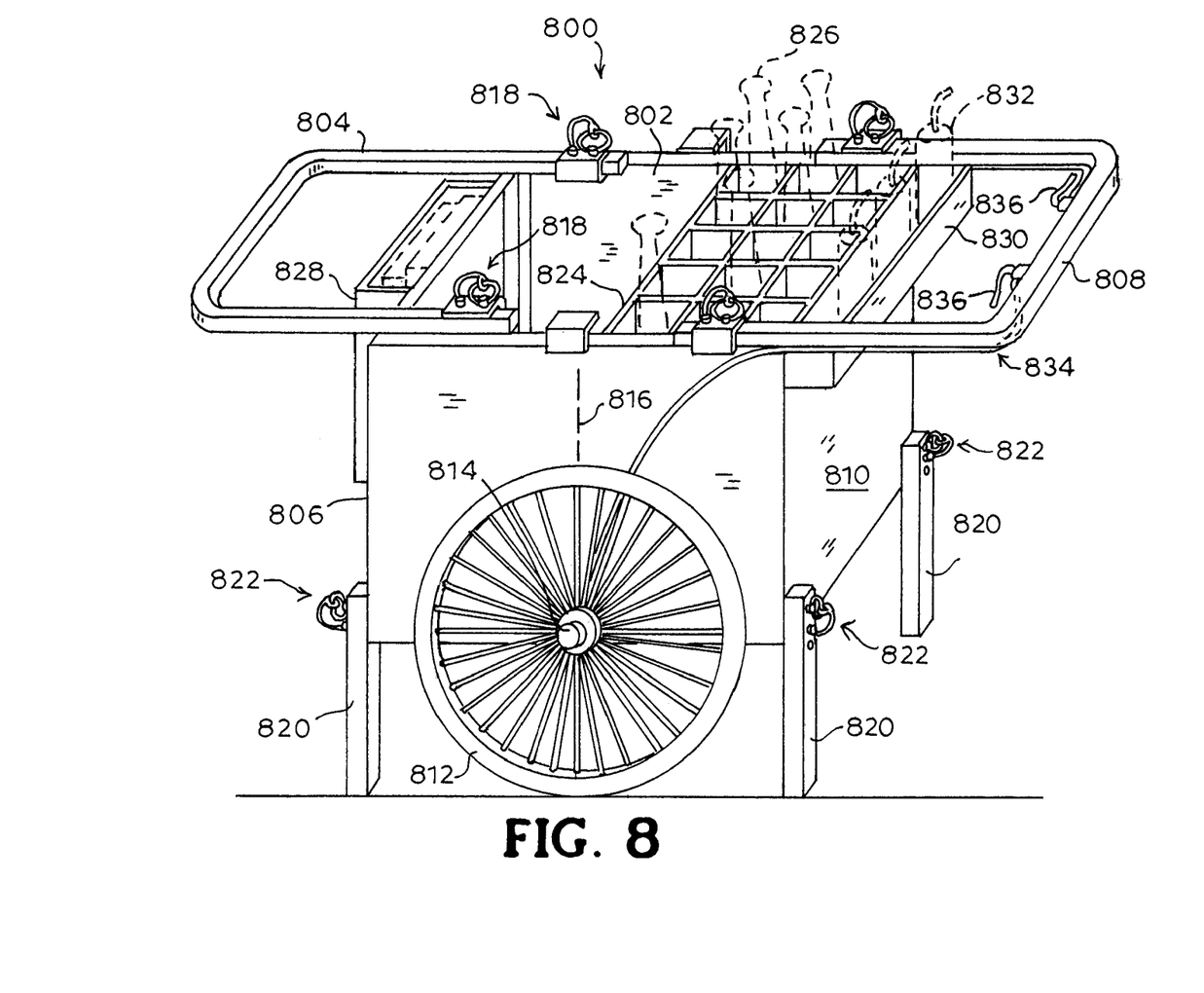
FIG. 8 is a perspective view of a cart in accordance with another embodiment of the present invention.

FIG. 8 is a perspective view of a cart 800 in accordance with another embodiment of the present invention. The cart 800 may include a compartment 802 to retain equipment or items. The compartment 802 may be similar to compartment 102 of FIGS. 1–3. A first handle 804 may extend from one end 806 of the cart 800 and a second handle 808 may extend from an opposite end 810 of the cart 800. Each of the first and second handles 804 and 808 may be substantially U-shaped with ends being slidably attaching to opposite sides of the cart 800 so that the handles 804 and 808 may be moved between an extended position to roll or operate the cart 800 and a retracted position to stow the cart 800. The first and second handles 804 and 808 may be attached to the cart 800 similar to handles 104 and 108 of FIG. 1. The first and second handles 804 and 808 may be used to simultaneously push and pull the cart 800. A wheel 812 may be removably mounted to an axle 814 on each side of the compartment 802 to roll or move the cart 800. Each wheel 812 may be similar to wheel 112 of FIGS. 1–3. Each of the wheels 812 may be removably mounted to the axle 814 proximate to a midpoint 816 of the cart 800 between each end 806 and 810 of the compartment 802 to substantially balance a load in or on the cart 800 between the first and second handles 804 and 808. A single axle may extend from one side of the cart 800 to the other side of the cart 800 to removably attach each wheel 812. In an alternate embodiment, each wheel 812 may be removable mounted to an associated axle similar to axle 114' described with respect to FIG. 3. Each associated axle may also be removable from the cart 800 to facilitate stowing or transporting the cart 800. The cart 800 may also include a mechanism 818 to retain each handle 804 and 808 in one of the retracted position or the extended position. The mechanism 818 may be similar to the mechanism 128 described with respect to FIGS. 1–3.

The cart 800 may also include at least one support leg 820 on each end of the cart 800. Each support leg 820 may be movable between a non-operative or retracted position to stow or roll the cart 800 and an operative or extended position to stabilize the cart 800 when the cart 800 is not being rolled. An assembly 822 may be provided to retain each support leg 820 in one of the retracted position and the extended position. The support leg retaining assembly 822 may be similar to the assembly 164 described with respect to FIGS. 1–3.

In accordance with one embodiment of the present invention, the compartment 802 may include a plurality of sub-compartments 824 to organize the cart 800 and to keep different types of equipment separate. For example, the compartment 802 may include a plurality of sub-compartments 824 that are each adapted to receive a baseball or softball bat 826 similar to that illustrated in FIG. 8.

In accordance with one embodiment of the present invention, the cart 800 may include a rack 828 or a tray 830 attached to an exterior of the compartment 802. For example, the rack 828 may be provided to hold clipboards, play books or the like. In some sports, individual water bottles 832 may be used by the players and the tray 830 may be provided to hold the water bottles 832.

In another embodiment of the present invention, a brake system 834 may be provided to facilitate control of the cart 800, particularly on steep grades or slopes. The brake system 834 may be similar to a standard bicycle braking system or the like. A brake handle 836 may be mounted to each side of handle 808 that may become a rear handle for operation by a person pushing the cart 800 to provide better control over the cart 800. A similar braking system could be used as well with respect to cart 100 in FIGS. 1–3.

Although specific embodiments have been illustrated and described herein, those of ordinary skill in the art appreciate that any arrangement which is calculated to achieve the same purpose may be substituted for the specific embodiments shown and that the invention has other applications in other environments. For example, the cart 100 or 800 may be narrow enough so that the cart may be rolled through a standard doorway for use indoors, such as for basketball, indoor soccer, hockey or the like. This application is intended to cover any adaptations or variations of the present invention. The following claims are in no way intended to limit the scope of the invention to the specific embodiments described herein.

The invention claimed is:

1. A cart, comprising:
   a compartment to retain equipment or items;
   a first pair of handles extendable from a one end of the compartment;
   a second pair of handles extendable from another end of the compartment, wherein the first and second pairs of handles permit the cart to be simultaneously pushed and pulled;
   a pair of wheels, each removably mounted to an axle on each side of the compartment; and
   a platform mounted to each end of the cart and pivotable between an operative position to support objects and a stowed position to stow the cart.

2. The cart of claim 1, wherein each of the pair of wheels is removably mounted to the axle proximate to a midpoint between each end of the compartment to substantially balance a load in or on the cart between the first and second pairs of handles.

3. The cart of claim 1, wherein the axle is removably attached to the cart.

4. The cart of claim 1, wherein each wheel is removably mounted to an associated axle that is removably attached to the cart.

5. The cart of claim 4, wherein the axle for each wheel is mounted proximate to a base of the compartment.

6. The cart of claim 1, wherein the compartment has a size to hold the wheels when the wheels are removed to stow the cart.

7. The cart of claim 1, wherein each handle of the first and second pairs of handles are movable between a retracted position to stow the cart and an extended position to roll the cart.

8. The cart of claim 7, further comprising a mechanism to retain each handle in one of the retracted position and the extended position.

9. The cart of claim 8, wherein the mechanism to retain each handle comprises one of a releasable pin, a latch or a set screw.

10. The cart of claim 7, further comprising a channel guide through which each of the first and second handles are slidable between the retracted position and the extended position.

11. The cart of claim 1, further comprising a support leg movable between a non-operative or retracted position and an operative or extended position to stabilize the cart when the cart is not being rolled by pushing and pulling the cart.

12. The cart of claim 1, further comprising at least one support leg on each end of the cart and movable between a non-operative or retracted position to stow or roll the cart and an operative or extended position to stabilize the cart when the cart is not being rolled.

13. The cart of claim 12, further comprising an assembly to retain each support leg in one of the non-operative or retracted position and the operative or extended position.

14. The cart of claim 1, further comprising a support assembly to support each platform in the operative position.

15. The cart of claim 14, wherein the support assembly comprises one of a chain, a cable or an articulating bracket attached to the cart and the platform to support objects placed on the platform and to permit the platform to pivot between the operative and stowed positions.

16. The cart of claim 1, further comprising an arrangement to retain each platform in at least the stowed position.

17. The cart of claim 16, wherein the arrangement comprises one of a latch or a releasable locking pin, wherein the releasable locking pin is insertable into a first opening formed in a bracket attached to the cart and through another opening formed in a frame of the platform when the openings are aligned with one another to retain the platform in the operative position and wherein the releasable locking pin is insertable into a second opening formed in the bracket and through the other opening formed in the frame of the platform when the second opening in the bracket is aligned with the other opening in the frame of the platform to retain the platform in the stowed position.

18. The cart of claim 1, further comprising a pair of support legs attached to each platform and movable between a non-operative or retracted position to stow or roll the cart and an operative or extended position to stabilize the cart when the cart is not being rolled.

19. The cart of claim 18, further comprising an assembly to retain each support leg respectively in the retracted position or the extended position.

20. The cart of claim 19, wherein each assembly comprises one of a latch or a releasable locking pin insertable into a first opening formed in the support leg and another opening formed in a frame of the platform to retain the support leg in the operative or extended position when the openings are aligned, and wherein the releasable locking pin is insertable into a second opening formed in the support leg and into the other opening-formed in the frame of the platform to retain the support leg in the non-operative or retracted position when the second opening and the other opening in the frame of the platform are aligned.

21. The cart of claim 1, wherein the compartment comprises a plurality of sub-compartments to hold different types of equipment.

22. The cart of claim 1, wherein at least a portion of the compartment comprises a plurality of sub-compartment each adapted to receive a baseball or softball bat.

23. The cart of claim 1, further comprising a tray or rack attached to the compartment to hold sports bottles or other items.

24. The cart of claim 1, further comprising a system to brake the wheels.

25. The cart of claim 1, wherein the cart has a width to permit the cart to be rolled through a doorway.

26. The cart of claim 1, wherein the first pair of handles are joined to form a single handle and the second pair of handles are joined to form a single handle.

27. A method of making a cart, comprising:
forming a compartment;
attaching a first pair of handles extendable from one end the cart;
attaching a second pair of handles extendable from an opposite end of the cart, wherein the first and second pairs of handles permit the cart to be simultaneously pushed and pulled;
removably mounting each wheel of a pair of wheels to an axle on each side of the cart; and
pivotally mounting a platform to each end of the cart, wherein each platform is pivotal between an operative position to support objects and a stowed position to stow the cart.

28. The method of claim 27, further comprising removably mounting the axle proximate to a midpoint between each end of the cart to substantially balance a load in or on the cart between the first and second pairs of handles.

29. The method of claim 27, further comprising removably mounting each wheel to an associated axle that is removably attached to the cart.

30. The method of claim 27, further comprising forming a mechanism to retain each handle in one of a retracted position and an extended position.

31. The method of claim 27, further comprising forming a support assembly to support each platform in the operative position.

32. The method of claim 27, further comprising attaching a pair of support legs to each platform, wherein each support leg is movable between a non-operative or retracted position and to stow or roll the cart and an operative or extended position to stabilize the cart when the cart is not being operated or rolled.

33. The method of claim 32, further comprising providing an assembly to retain each support leg respectively in the retracted position or the extended position.

* * * * *